United States Patent
Bhattad et al.

(10) Patent No.: US 10,645,682 B2
(45) Date of Patent: May 5, 2020

(54) TECHNIQUES AND APPARATUSES FOR PHYSICAL DOWNLINK CONTROL CHANNEL DOWNLINK CONTROL INFORMATION TO SEARCH SPACE MAPPING

(71) Applicant: QUALCOMM Incorporated, San Diego, CA (US)

(72) Inventors: Kapil Bhattad, Bangalore (IN); Hao Xu, Beijing (CN); Alberto Rico Alvarino, San Diego, CA (US); Xiaofeng Wang, San Diego, CA (US); Peter Gaal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 80 days.

(21) Appl. No.: 15/793,580

(22) Filed: Oct. 25, 2017

(65) Prior Publication Data

US 2019/0124626 A1 Apr. 25, 2019

(51) Int. Cl.
*H04W 72/12* (2009.01)
*H04W 72/04* (2009.01)
*H04L 5/00* (2006.01)
*H04L 1/00* (2006.01)

(52) U.S. Cl.
CPC ......... *H04W 72/042* (2013.01); *H04L 1/0038* (2013.01); *H04L 5/0053* (2013.01); *H04L 5/0092* (2013.01); *H04L 1/0046* (2013.01); *H04L 5/006* (2013.01); *H04L 5/0007* (2013.01); *H04L 5/0058* (2013.01); *H04L 5/0087* (2013.01); *H04L 5/0091* (2013.01)

(58) Field of Classification Search
CPC ..... H04W 56/00; H04W 24/00; H04W 24/08; H04W 56/0035; H04W 76/10; H04L 1/0026; H04L 1/0072; H04L 1/20; H04L 5/001; H04L 5/0023; H04L 5/0035; H04L 5/0051; H04L 5/0053; H04L 5/0055
See application file for complete search history.

(56) References Cited

U.S. PATENT DOCUMENTS 8,724,636 B2 5/2014 Chen et al.
9,591,635 B2 3/2017 Sartori et al.
(Continued)

OTHER PUBLICATIONS

Wu Y., et al., "A New Downlink Control Channel Scheme for LTE", IEEE 77th Vehicular Technology Conference (VTC Spring), Jun. 2013, 6 Pages.
(Continued)

*Primary Examiner* — Quan M Hua
(74) *Attorney, Agent, or Firm* — Qualcomm IP Dept.; James Hunt Yancey, Jr.

(57) ABSTRACT

Certain aspects of the present disclosure generally relate to wireless communication. In some aspects, a user equipment may identify a payload size, associated with performing a search for a physical downlink control channel (PDCCH), wherein the payload size is identified based at least in part on an aggregation level, associated with performing the search for the PDCCH, or an offset associated with performing the search for the PDCCH; and perform the search for the PDCCH based at least in part on the payload size. Numerous other aspects are provided.

31 Claims, 11 Drawing Sheets

(56) References Cited

U.S. PATENT DOCUMENTS

| | | | | |
|---|---|---|---|---|
| 2009/0257449 | A1* | 10/2009 | Chen | H04L 1/0041 370/470 |
| 2011/0310856 | A1* | 12/2011 | Hariharan | H04L 1/1607 370/336 |
| 2012/0021756 | A1* | 1/2012 | Kwon | H04L 5/0053 455/450 |
| 2017/0019227 | A1 | 1/2017 | Han et al. | |
| 2017/0163397 | A1 | 6/2017 | Gaal | |

OTHER PUBLICATIONS

CATT: "Design of sPDCCH Search Space," 3GPP Draft, R1-1707432, 3rd Generation Partnership Project (3GPP), Mobile Competence Centre; 650, Route Des Lucioles; F-06921 Sophia-Antipolis Cedex; France, vol. RAN WG1, No. Hangzhou; May 14, 2017 (May 14, 2017), 3 pages, XP051272641, Retrieved from the Internet: URL: http://www.3gpp.org/ftp/Meetings_3GPP_SYNC/RAN1/Docs/ [retrieved on May 14, 2017].

CATT: "Search Space Design for NR-PDCCH," 3GPP Draft, R1-1712393, 3rd Generation Partnership Project (3GPP), Mobile Competence Centre; 650, Route Des Lucioles; F-06921 Sophia-Antipolis Cedex; France, vol. RAN WG1, No. Prague, Czechia; Aug. 20, 2017 (Aug. 20, 2017), 5 pages, XP051315209, Retrieved from the Internet: URL: http://www.3gpp.org/ftp/Meetings_3GPP_SYNC/RAN1/Docs/ [retrieved on Aug. 20, 2017].

CMCC: "Discussion on PDCCH Search Space", 3GPP Draft; R1-1717884, 3rd Generation Partnership Project (3GPP), Mobile Competence Centre; 650, Route Des Lucioles; F-06921 Sophia-Antipolis Cedex; France, vol. RAN WG1, No. Prague, CZ, Oct. 8, 2017 (Oct. 8, 2017), 6 Pages, XP051341068, Retrieved from the Internet: URL: http://www.3gpp.org/ftp/Meetings_3GPP_SYNC/RANL/Docs/ [retrieved on Oct. 8, 2017].

International Search Report and Written Opinion—PCT/US2018/053341—ISA/EPO—dated Jan. 25, 2019.

LG Electronics: "Discussion on Hierarchical Structure of Search Space," 3GPP Draft; R1-1704904 Discussion on Hierarchical Structure of Search Space Final, 3rd Generation Partnership Project (3GPP), Mobile Competence Centre; 650, Route Des Lucioles; F-06021 Sophia-Antipo, vol. RAN WG1, No. Spokane, US; Apr. 3, 2017-Apr. 7, 2017, Apr. 2, 2017, XP051243039, 6 pages, Retrieved from the Internet: URL: http://www.3gpp.org/ftp/Meetings_3GPP_SYNC/RAN1/Docs/ [retrieved on Apr. 2, 2017].

QUALCOMM Incorporated: "Discussion on DCI Related Issues," 3GPP Draft; R1-1718557, DCI_Related_Issues, 3rd Generation Partnership Project (3GPP), Mobile Competence Centre; 650, Route Des Lucioles; F-06921 Sophia-Antipolis Cedex; France, vol. RAN WG1, No. Prague, Czech Republic, Oct. 8, 2017 (Oct. 8, 2017), 6 Pages, XP051341738, Retrieved from the Internet: URL: http://www.3gpp.org/ftp/Meeting_3GPP_SYNC/RAN1/Docs/ [retrieved on Oct. 8, 2617].

QUALCOMM Incorporated: "PDCCH Blind Decoding Capability", 3GPP Draft; R1-1713427, PDCCH Blind Decoding Capability, 3rd Generation Partnership Project (3GPP), Mobile Competence Centre; 650, Route Des Lucioles; F-06921 Sophia-Antipolis Cedex; France, vol. RAN WG1, No. Prague, Czech Republic, Aug. 20, 2017 (Aug. 20, 2017), 2 Pages, XP051316229, Retrieved from the Internet: URL: http://www.3gpp.org/ftp/Meetings_3GPP_SYNC/RANI/Docs/ [retrieved on Aug. 20, 2017].

\* cited by examiner

■ = Payload Size X
□ = Payload Size Y

| Offset 0 Agg. Level 1 | Offset 1 Agg. Level 1 | Offset 2 Agg. Level 1 | Offset 3 Agg. Level 1 |
|---|---|---|---|
| Offset 0 Agg. Level 2 | | Offset 1 Agg. Level 2 | |
| Offset 0 Agg. Level 4 | | | |

FIG. 7C

| Offset 0 Agg. Level 1 | Offset 1 Agg. Level 1 | Offset 2 Agg. Level 1 | Offset 3 Agg. Level 1 |
|---|---|---|---|
| Offset 0 Agg. Level 2 | | Offset 1 Agg. Level 2 | |
| Offset 0 Agg. Level 4 | | | |

FIG. 7D

| Offset 0 Agg. Level 1 | Offset 1 Agg. Level 1 | Offset 2 Agg. Level 1 | Offset 3 Agg. Level 1 |
|---|---|---|---|
| Offset 0 Agg. Level 2 | | Offset 1 Agg. Level 2 | |
| Offset 0 Agg. Level 4 | | | |

FIG. 7E

TECHNIQUES AND APPARATUSES FOR PHYSICAL DOWNLINK CONTROL CHANNEL DOWNLINK CONTROL INFORMATION TO SEARCH SPACE MAPPING

FIELD OF THE DISCLOSURE

Aspects of the present disclosure generally relate to wireless communication, and more particularly to techniques and apparatuses for physical downlink control channel (PDCCH) downlink control information (DCI) to search space mapping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication may include identifying, by a UE, a payload size, associated with performing a search for a PDCCH, wherein the payload size is identified based at least in part on an aggregation level, associated with performing the search for the PDCCH, or an offset associated with performing the search for the PDCCH; and performing, by the UE, the search for the PDCCH based at least in part on the payload size.

In some aspects, a user equipment for wireless communication may include memory and one or more processors operatively coupled to the memory. The memory and the one or more processors may be configured to identify a payload size, associated with performing a search for a PDCCH, wherein the payload size is identified based at least in part on an aggregation level, associated with performing the search for the PDCCH, or an offset associated with performing the search for the PDCCH; and perform the search for the PDCCH based at least in part on the payload size.

In some aspects, a non-transitory computer-readable medium may store one or more instructions for wireless communication. The one or more instructions, when executed by one or more processors of a user equipment, may cause the one or more processors to identify a payload size, associated with performing a search for a PDCCH, wherein the payload size is identified based at least in part on an aggregation level, associated with performing the search for the PDCCH, or an offset associated with performing the search for the PDCCH; and perform the search for the PDCCH based at least in part on the payload size.

In some aspects, an apparatus for wireless communication may include means for identifying a payload size, associated with performing a search for a PDCCH, wherein the payload size is identified based at least in part on an aggregation level, associated with performing the search for the PDCCH, or an offset associated with performing the search for the PDCCH; and means for performing the search for the PDCCH based at least in part on the payload size.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7A-7E are diagrams illustrating examples associated with PDCCH DCI to search space mapping, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
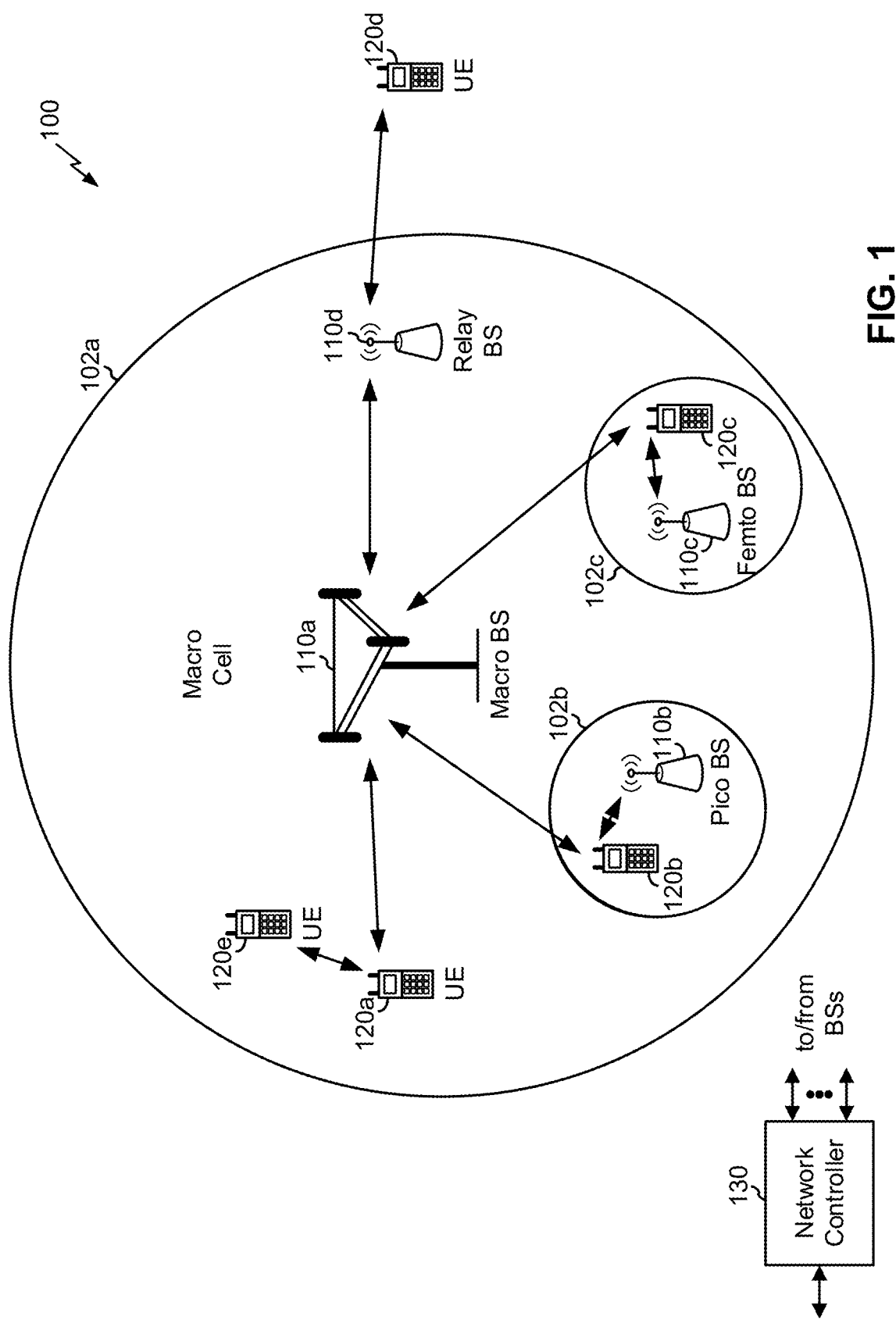
FIG. 1 is a block diagram conceptually illustrating an example of a wireless communication network, in accordance with certain aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
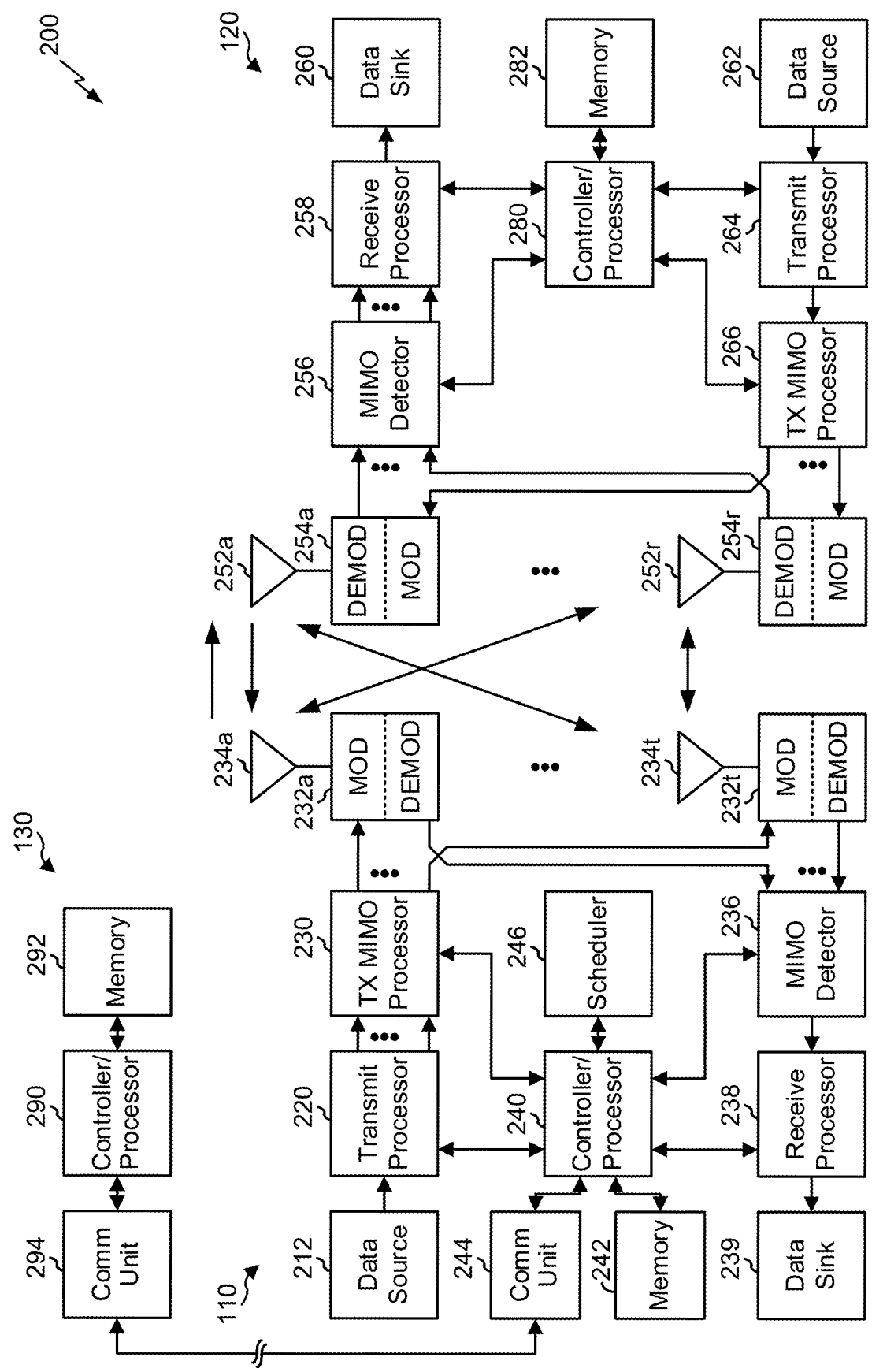
FIG. 2 is a block diagram conceptually illustrating an example of a base station in communication with a user equipment (UE) in a wireless communication network, in accordance with certain aspects of the present disclosure.

FIG. 2 shows a block diagram of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with PDCCH DCI to search space mapping, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying a payload size, associated with performing a search for a PDCCH, wherein the payload size is identified based at least in part on an aggregation level, associated with performing the search for the PDCCH, or an offset associated with performing the search for the PDCCH, means for performing the search for the PDCCH based at least in part on the payload size, and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
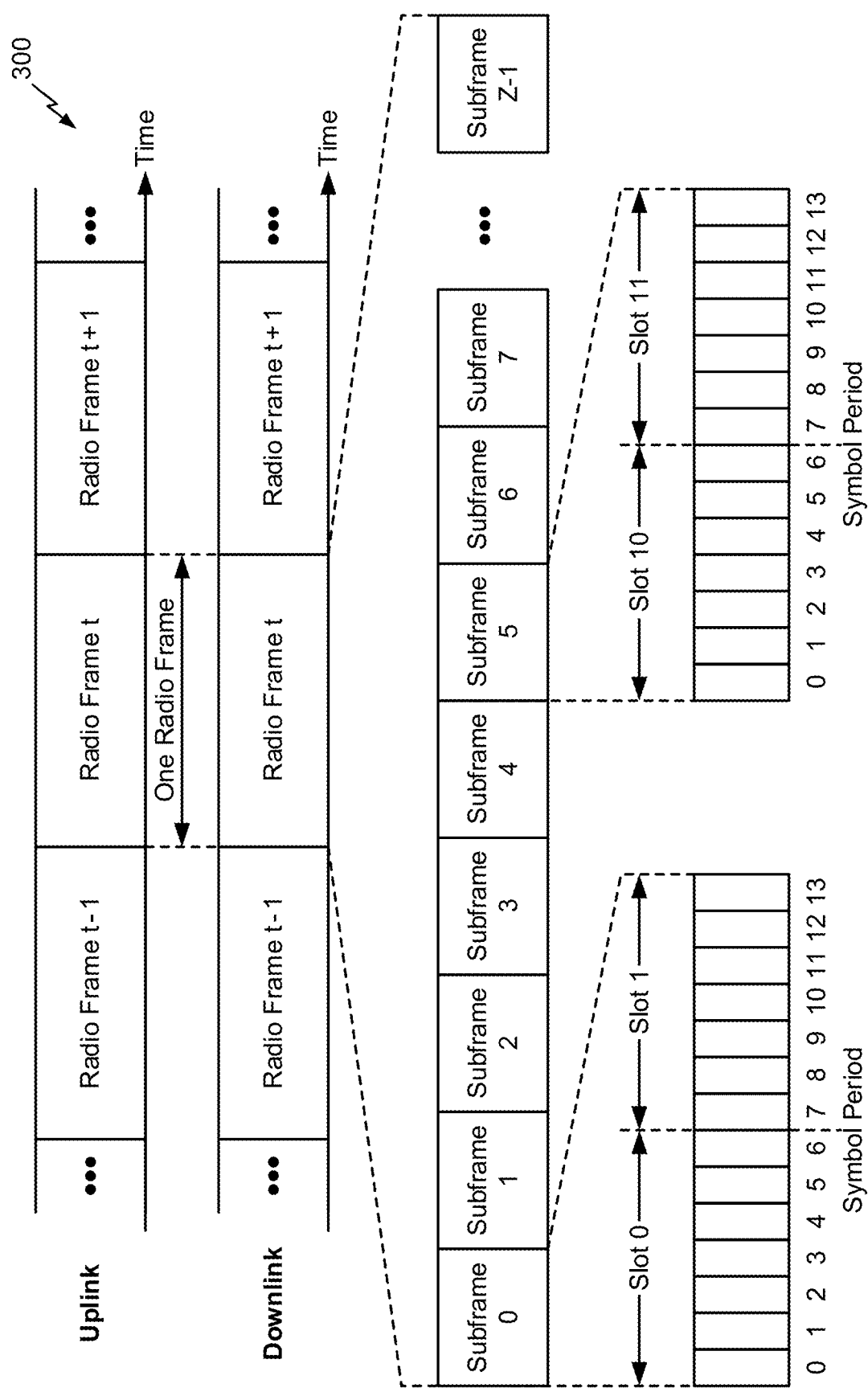
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
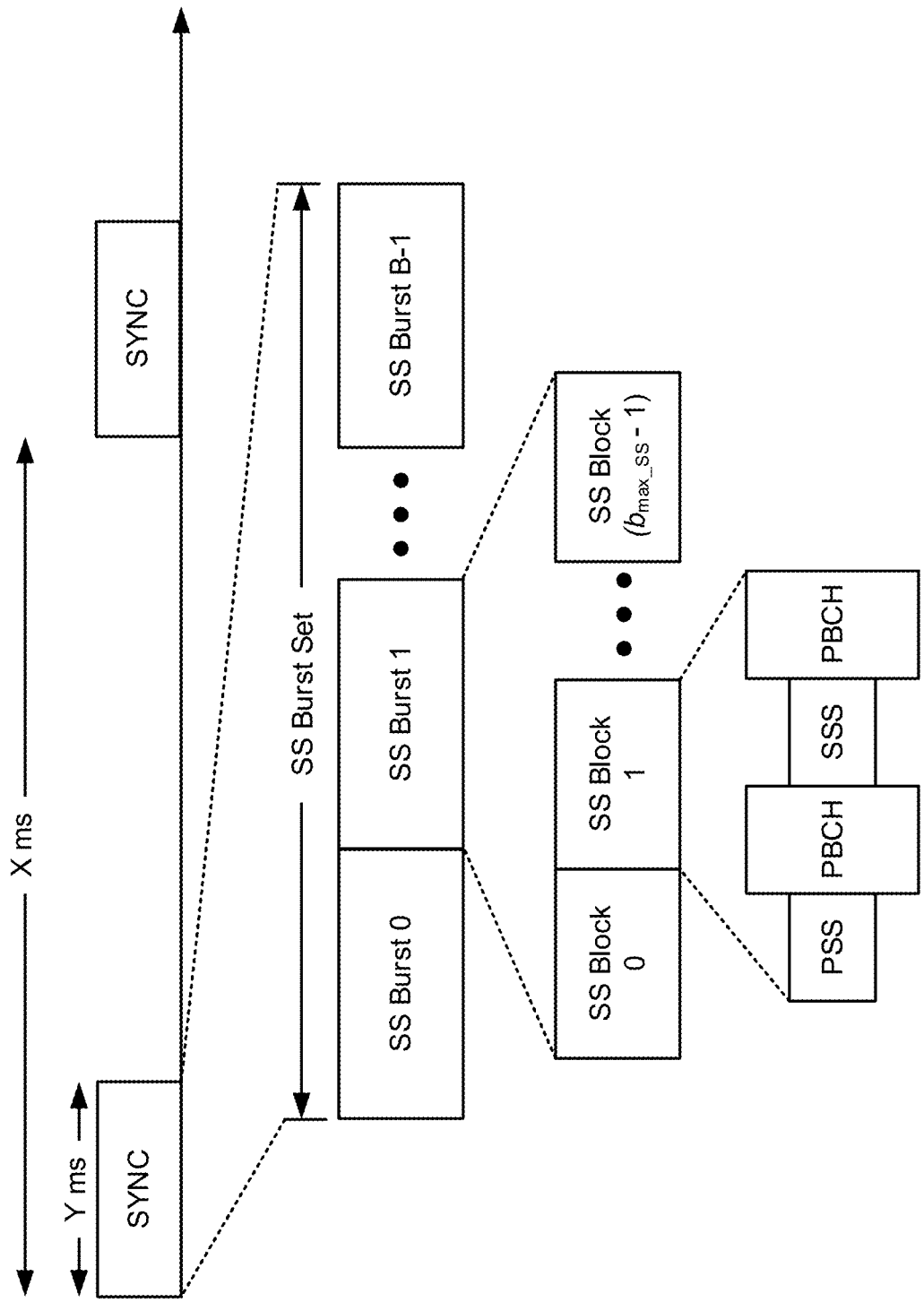
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
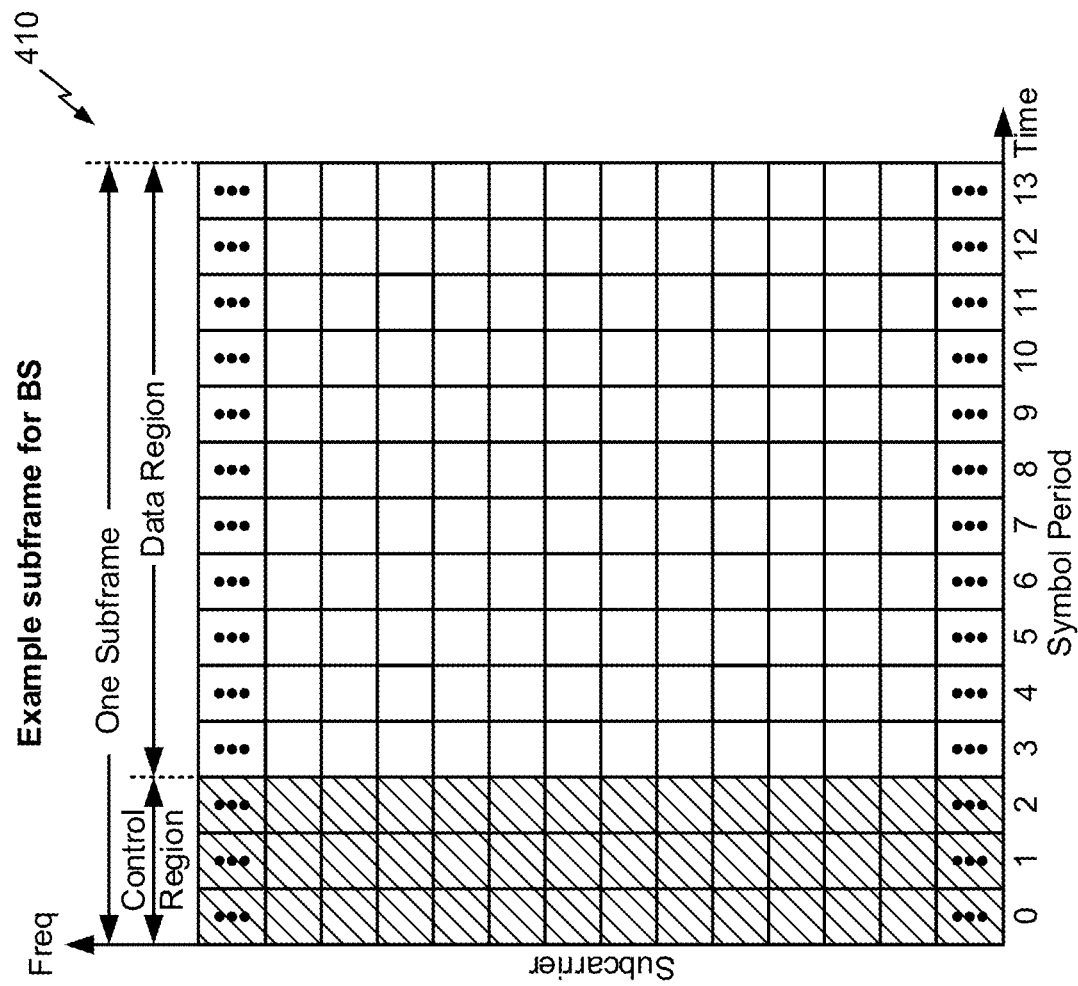
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
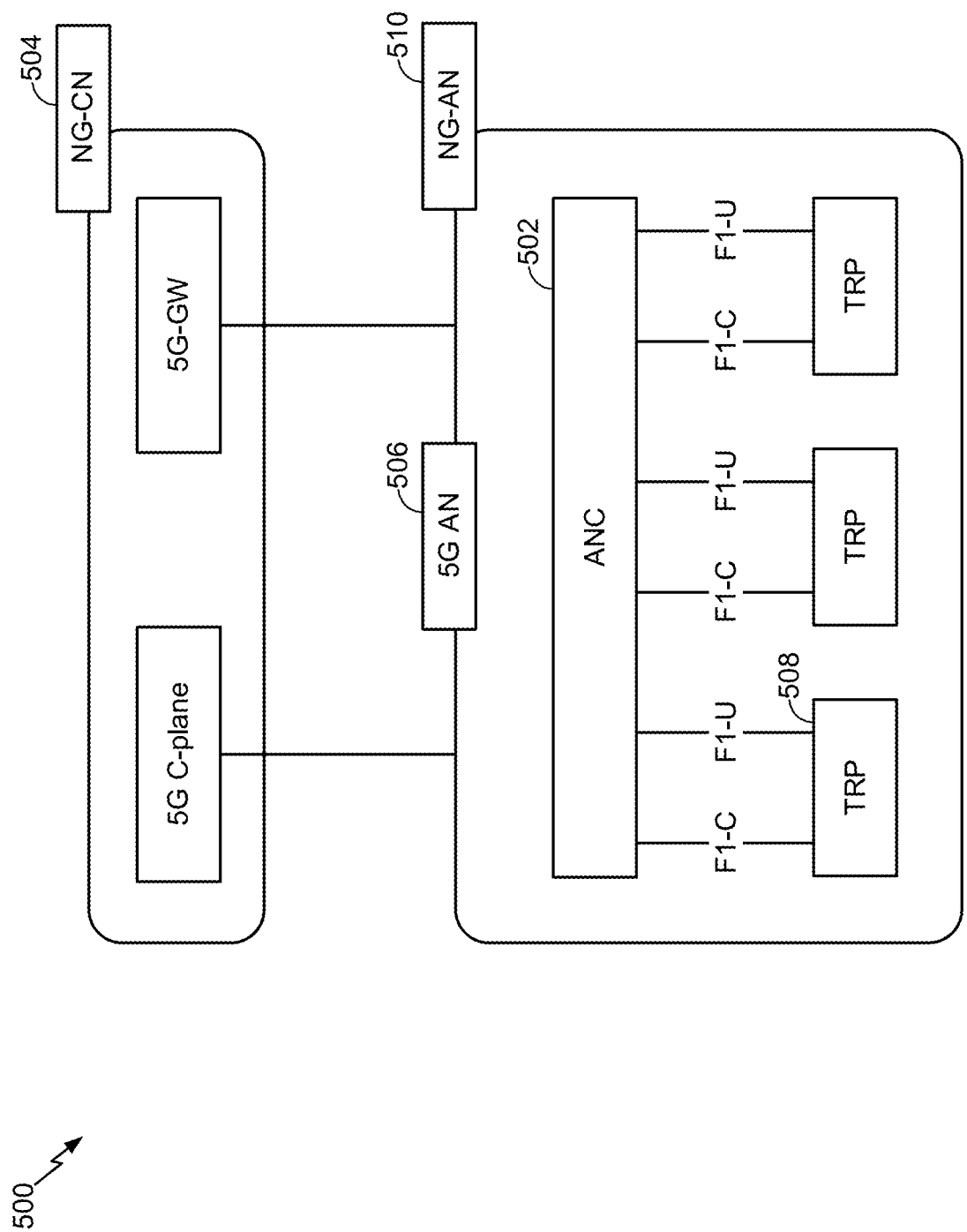
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
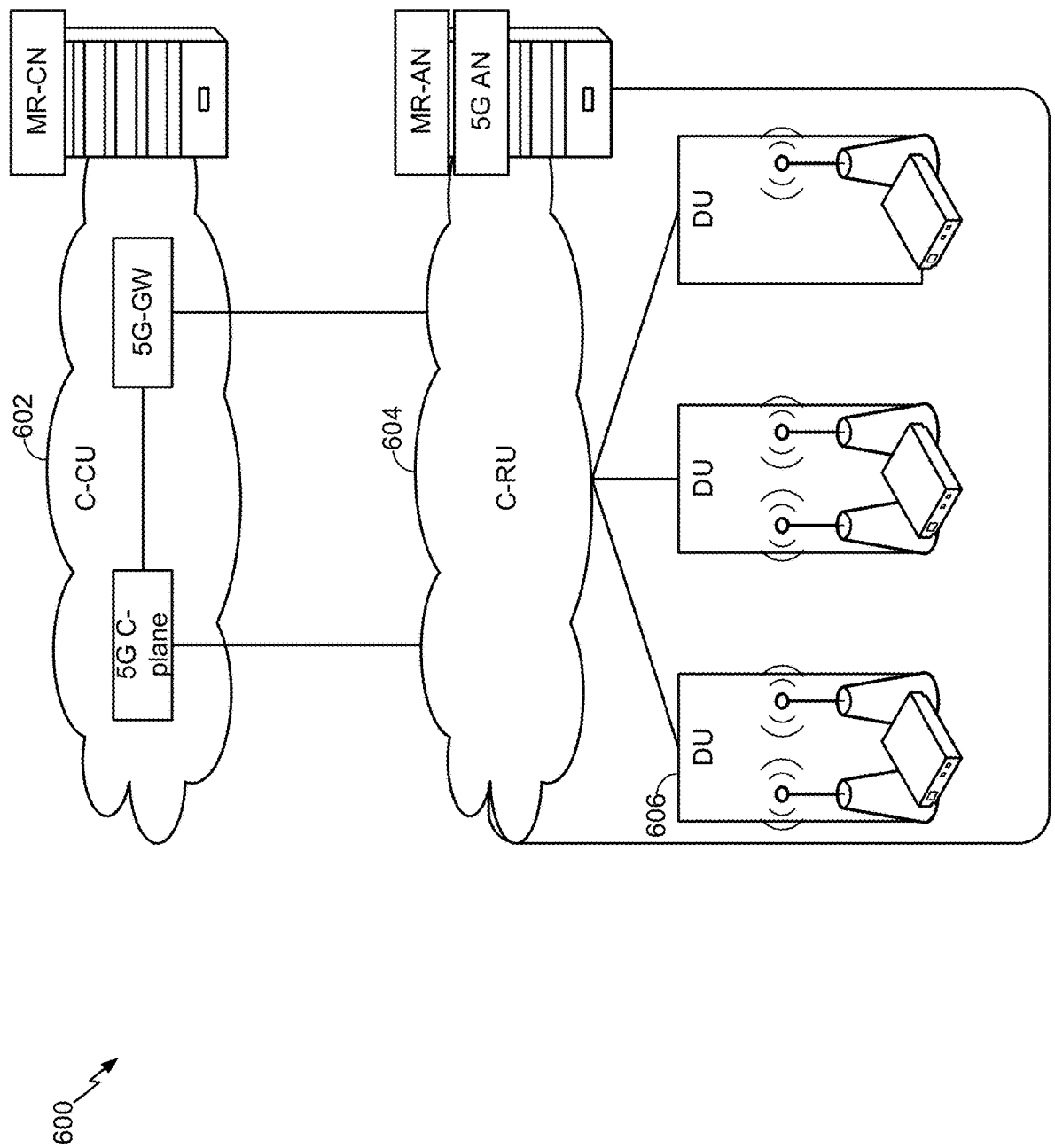
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

In a wireless system, a UE searches for a PDCCH that carries control information (e.g., downlink control information (DCI) common to multiple UEs and/or DCI for that specific UE). The UE may search both a common search space (e.g., a space that carries common DCI) and a UE-specific search space (e.g., a space that carries UE-specific DCI) for a PDCCH.

Within a given search space, an offset of the PDCCH (e.g., a location relative to a start of a subframe carrying the PDCCH search space, a location in reordered resource elements of a PDCCH search space relative to a starting resource element associated with an aggregation level and a search space type, such as a UE-specific search space, a common search space, and/or the like), an aggregation level of the PDCCH (e.g., a length of the PDCCH), and/or a payload size of the PDCCH may vary among subframes. The different aggregation levels allow a base station to adapt a coding rate (e.g., a number of payload information bits to a number of resource elements) according to requirements of the UE in order to, for example, match a SNR seen at the UE. For a fixed payload size, a comparatively larger aggregation level would mean a lower rate (and, hence, would be decodable at a lower SNR) than a comparatively smaller aggregation level. Having multiple offsets provides the base station with scheduling flexibility in scheduling the PDCCH. For example, if resource elements in a first offset location in the search space of a first UE are used for sending data or control for a second UE, then resource elements starting from a second offset that is within the search space of the first UE can be used to send the PDCCH to the first UE. If the UE was only monitoring the first offset, then the base station may not be able to send the PDCCH to the first UE without rescheduling the second UE. Thus, in some cases, the UE may need to search at all offsets and all aggregation levels for every possible payload size in order to determine the PDCCH. Furthermore, the UE may perform separate searches in both the common search space and the UE-specific search space. However, a number of PDCCH decodes, associated with searching for the PDCCH, that the UE is capable of attempting for a given single subframe or a PDCCH search space (e.g., in a case where the PDCCH search space spans more than one subframe) may be limited (e.g., since hardware of the UE may be capable of processing a limited number of searches during a given subframe or for a given PDCCH search space).

In a long term evolution (LTE) system, this issue is addressed by allowing the UE to search only for a particular set of payload sizes, where the particular set of payload sizes searched depends on the search space within which the UE is searching. For example, the UE may search at all offsets and all aggregations levels for a first set of particular payload sizes in the common search space, and may search at all offsets and all aggregation levels for a second particular set of payload sizes in the UE-specific search space.

In some new radio (NR) systems, the issue may be partially addressed by allowing the UE to search for a single payload size within a given search space (e.g., such that the UE searches at all aggregations levels and all offsets for the single payload size). However, this constraint limits flexibility in PDCCH payload sizes (e.g., such that the PDCCH payload size cannot be flexibly increased, as in the case of ACK bundling, where additional bits need to be added to the PDCCH payload). One technique for resolving this issue is to always transmit additional bits in the PDCCH so that the UE may continue to search for a single payload size. However, UE performance may suffer due to the need to search for a larger payload. For example, if the UE is at an edge of coverage (e.g., with a relatively low signal-to-noise ratio (SNR)), then the UE may not be able to receive the PDCCH due to the increased payload size that results in a lower coding rate.

Some aspects described herein provide techniques and apparatuses associated with searching for a PDCCH by a UE, where a searched payload size, associated with the search, is based at least in part on the aggregation level and/or the offset at which the UE is searching for the PDCCH (e.g., in addition to the search space type).

For example, in a given search space, the UE may search for a first payload size at a first aggregation level, and may search for a second payload size at a second aggregation level and at a third aggregation level.

As another example, in a given search space, the UE may search for a first payload size at a first aggregation level and at a first offset, at the first aggregation level and at a third offset, and at a second aggregation level and at a first offset. Continuing with this example, the UE may search for a second payload size at the first aggregation level and at a second offset, at the first aggregation level and at a fourth offset, at the second aggregation level and at a second offset, and at a third aggregation level.

In some cases, causing the searched payload size to depend on the aggregation level and/or offset does not increase a number of decode attempts at the UE (i.e., complexity at the UE is not increased as compared to searching for a single payload size), and provides flexibility in allowing transmissions of PDCCHs with payloads of different sizes, thereby improving performance of the wireless network.

FIGS. 7A-7E are diagrams illustrating examples 700 associated with PDCCH DCI to search space mapping, in accordance with various aspects of the present disclosure.

Figure 7A:
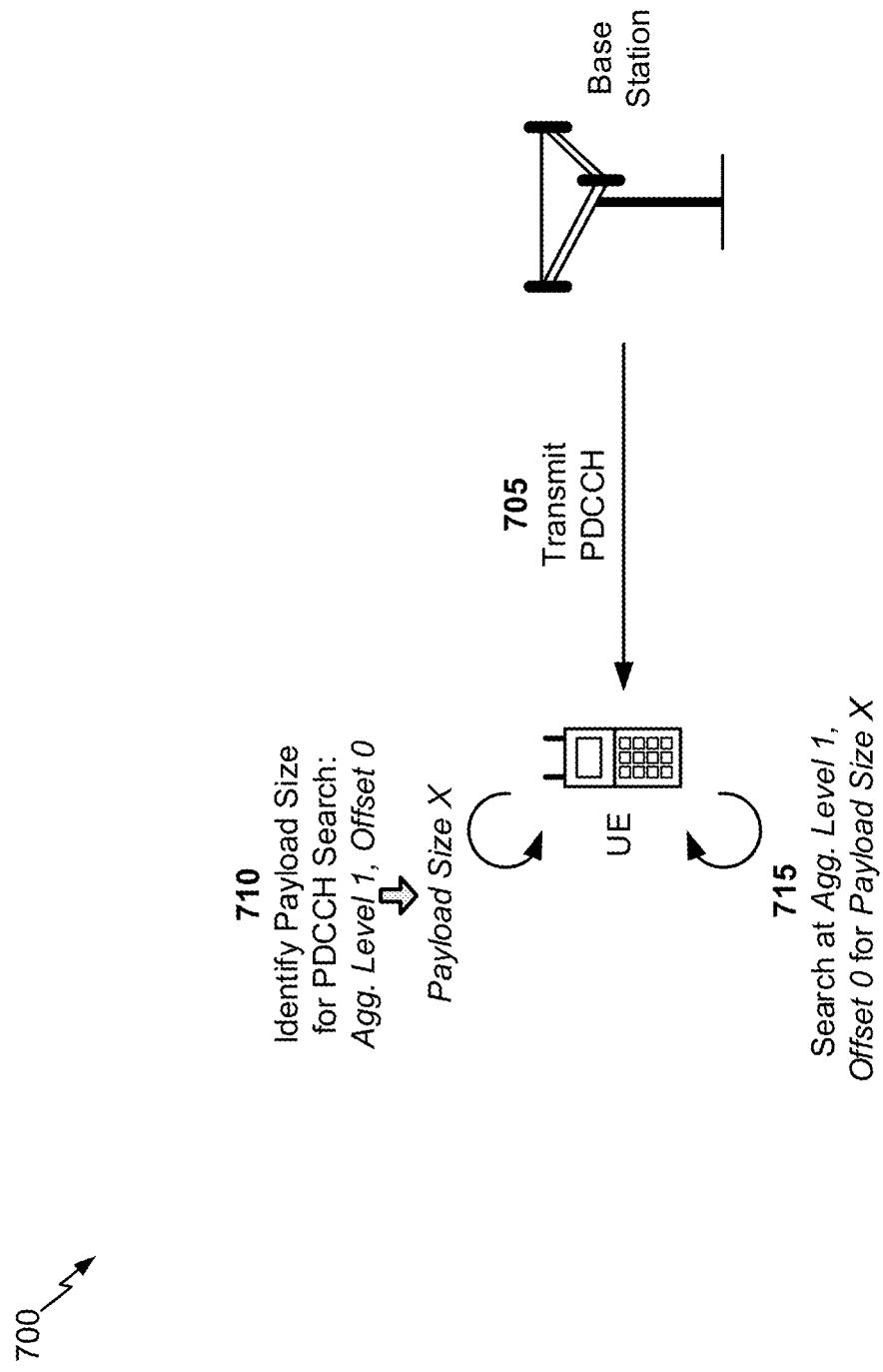

As shown in FIG. 7A, and by reference number 705, a base station may transmit a PDCCH for reception by the UE. In some aspects, the PDCCH may carry control information (e.g., DCI) that is common to multiple UEs and, thus, may be transmitted in a common search space (e.g., a search space to be searched by multiple UEs). In some aspects, the PDCCH may carry control information that is specific to the UE and, thus, may be transmitted in a UE-specific search space. In some cases, a PDCCH that may carry control information that is specific to the UE may also be sent in a common search space since the UE is monitoring the common search space anyway.

As shown by reference number 710, the UE may identify a payload size, associated with performing a search for the PDCCH. In some aspects, the UE may identify the payload size based at least in part on an aggregation level and/or an offset associated with performing the search.

For example, as described above, the UE may be capable of searching for the PDCCH at different offsets at different aggregation levels (e.g., offsets 0 through 3 at aggregation level 1, offsets 0 and 1 at aggregation level 2, offset 0 at aggregation level 4, offset 0 at aggregation level 8, and/or the like). When searching for the PDCCH, the UE may perform a search at an offset and an aggregation level in association with attempting to decode the PDCCH, and may perform additional searches (e.g., at other offsets and/or other aggregation levels). In some aspects, a payload size, searched for by the UE at a given offset and/or a given aggregation level, may be identified based at least in part on the given offset and/or the given aggregation level.

For example, the UE may identify a first payload size in association with a search in a given search space at a first aggregation level (e.g., at all offsets of the first aggregation level). In this example, the UE may identify a second payload size (e.g., a payload size that differs from the first payload size) in association with a search at a second aggregation level and at a third aggregation level (e.g., at all offsets of the second aggregation level and all offsets of the third aggregation level). In other words, in some aspects, the UE may identify a payload size, associated with a search, based at least in part on the aggregation level associated with the search. FIG. 7C is a diagram associated with an example of a mapping scheme for identifying a payload size, associated with a search, based at least in part on the aggregation level associated with the search.

As another example, the UE may identify a first payload size in association with a search in a given search space at a first offset (e.g., at all aggregations levels at the first offset). In this example, the UE may identify a second payload size in association with a search at a second offset, a third offset, or a fourth offset (e.g., at all aggregation levels at the second offset, the third offset, and the fourth offset). In other words, in some aspects, the UE may identify a payload size, associated with a search, based at least in part on the offset associated with the search. FIG. 7D is a diagram associated with an example of a mapping scheme for identifying a payload size, associated with a search, based at least in part on the offset associated with the search.

As yet another example, the UE may identify a first payload size in association with a search in a given search space at a first aggregation level and at a first offset, at the first aggregation level and at a third offset, and at a second aggregation level and at a first offset. In this example, the UE may identify a second payload size in association with a search at the first aggregation level and at a second offset, at the first aggregation level and at a fourth offset, at the second aggregation level and at a second offset, and at a third aggregation level. In other words, in some aspects, the UE may identify a payload size, associated with a search, based at least in part on the aggregation level, associated with the search, and the offset associated with the search. FIG. 7E is a diagram associated with an example of a mapping scheme for identifying a payload size, associated with a search, based at least in part on the aggregation level, associated with the search, and the offset associated with the search.

Notably, while the examples described above are described in the context of a particular number of aggregation levels, a particular number of offsets, and two payload sizes, a mapping scheme may be associated with a different number of aggregation levels, a different number of offsets, a different number of payload sizes (e.g., three or more payload sizes) than those described, in some aspects.

In some aspects, the UE may identify the payload size further based at least in part on a search space type associated with the search. For example, a common search space may be associated with a first mapping scheme, while a UE-specific search space may be associated with a second mapping scheme that differs from the first mapping scheme. Here, the UE may identify the mapping scheme, associated with the search space to be searched by the UE, and may then identify the payload size based at least in part on the aggregation level and/or the offset.

In some aspects, a given aggregation level and/or a given offset may be associated with multiple (e.g., different)

payload sizes (e.g., such that the UE searches the given aggregation level and/or the given offset for each of the multiple payload sizes). In some aspects, a number of payload sizes, based at least in part on which the UE is to perform searches for the PDCCH, is associated with the aggregation level or the offset. For example, the UE may search for two different payload sizes at a first aggregation level and at a first offset, and may search for a single payload size at a second aggregation level and at a second offset (e.g., as indicated by the mapping scheme stored or accessible by the UE).

Returning to FIG. 7A, in some aspects, the UE may identify the payload size based at least in part on information associated with a mapping scheme, stored or accessible by the UE, that maps aggregation levels and offsets, associated with PDCCH searches, to a set of payload sizes (e.g., such as those illustrated in FIGS. 7C-7E). In some aspects, the UE may receive the mapping information from a base station or another device associated with the wireless network.

As further shown in FIG. 7A, and with reference to the mapping scheme illustrated in FIG. 7E, for a search at a first aggregation level (e.g., aggregation level 1) and at a first offset (e.g., offset 0), the UE identifies a first payload size (e.g., payload size X) as a payload size associated with performing the search for the PDCCH.

As shown by reference number 715, the UE may perform the search for the PDCCH based at least in part on the first payload size. In other words, the UE may search at aggregation level 1 and at offset 0 for a PDCCH with a payload size of X. In this example, assume that the UE does not successfully decode the PDCCH based at least in part on the search and, thus, is to perform additional searches (e.g., other aggregation levels and/or other offsets) for the PDCCH.

Figure 7B:
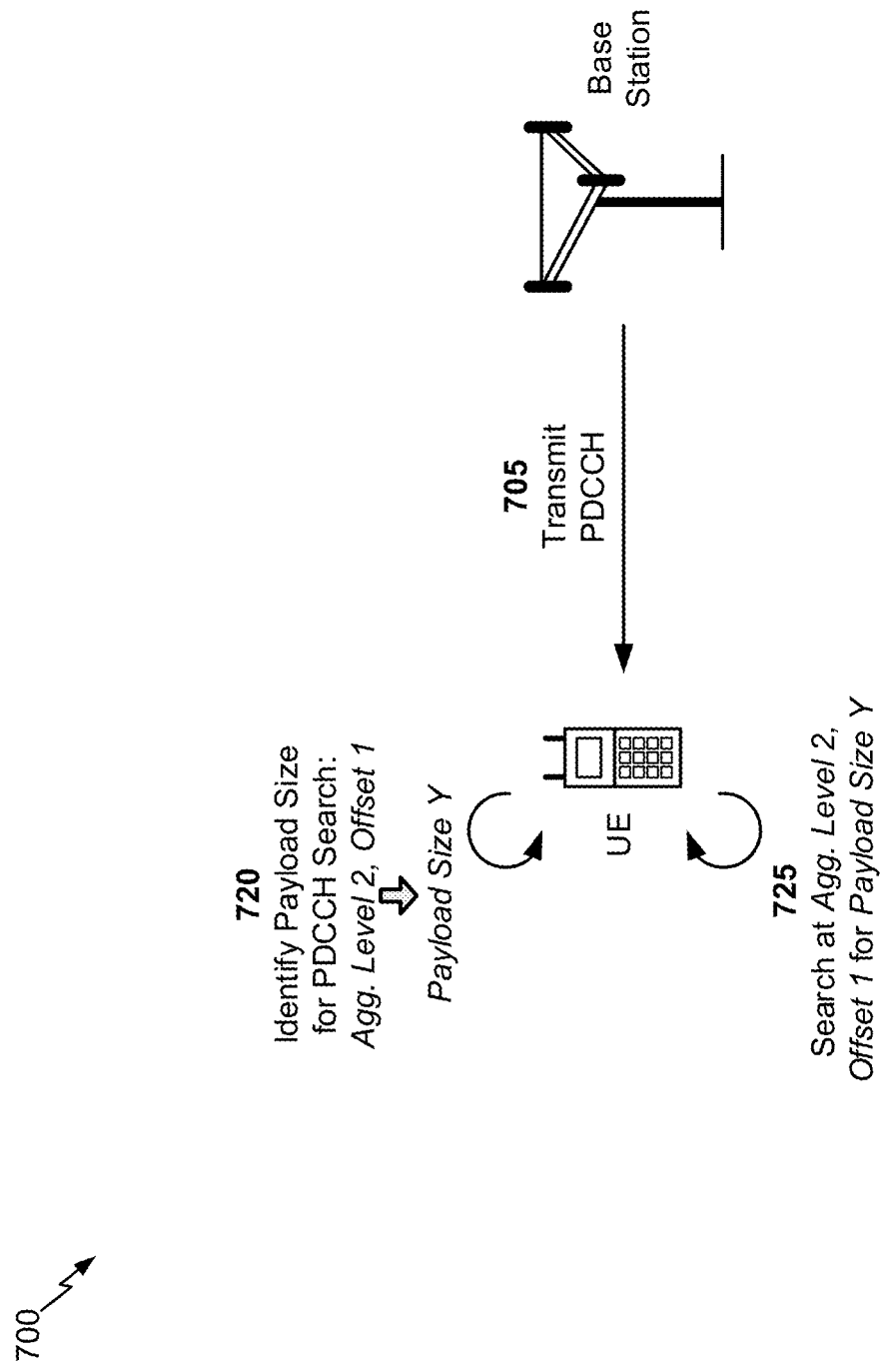

As shown in FIG. 7B, and by reference number 720, for a search at a second aggregation level (e.g., aggregation level 2) and at a second offset (e.g., offset 1), the UE identifies a second payload size (e.g., payload size Y) as a payload size to be searched. As shown by reference number 725, the UE may perform the search for the PDCCH based at least in part on the second payload size. In other words, the UE may search at aggregation level 2 and at offset 1 for a PDCCH with a payload size of Y.

In some aspects, the UE may continue performing searches in this manner until the UE successfully decodes the PDCCH, until a threshold amount of time is reached, until the UE has performed a threshold number of searches, until the UE has made a threshold number of decoding attempts, and/or the like. In some aspects, a number of searches, performed by the UE, may be configured such that a number of decoding attempts (e.g., associated with the searches) is within a capability threshold associated with the UE (e.g., a time threshold, a power consumption threshold, a processor resources usage threshold, and/or the like).

As indicated above, FIGS. 7A-7E are provided as examples. Other examples are possible and may differ from what was described with respect to FIGS. 7A-7E.

Figure 8:
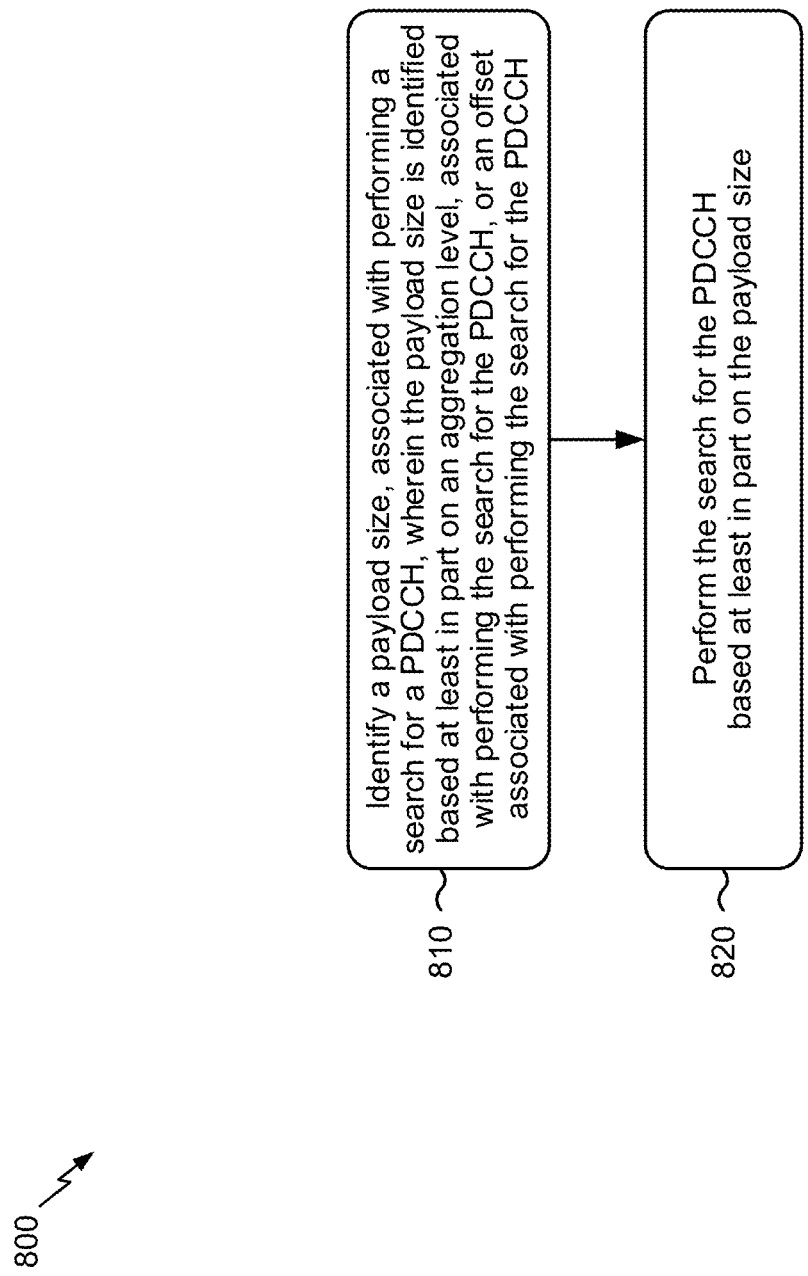
FIG. 8 is a diagram illustrating an example process performed, for example, by a user equipment, in accordance with various aspects of the present disclosure.

FIG. 8 is a diagram illustrating an example process 800 performed, for example, by a UE (e.g., UE 120), in accordance with various aspects of the present disclosure.

As shown in FIG. 8, in some aspects, process 800 may include identifying a payload size, associated with performing a search for a PDCCH, wherein the payload size is identified based at least in part on an aggregation level, associated with performing the search for the PDCCH, or an offset associated with performing the search for the PDCCH (block 810). For example, the UE may identify a payload size, associated with performing a search for a PDCCH, wherein the payload size is identified based at least in part on an aggregation level, associated with performing the search for the PDCCH, or an offset associated with performing the search for the PDCCH, as described above.

As further shown in FIG. 8, in some aspects, process 800 may include performing the search for the PDCCH based at least in part on the payload size (block 820). For example, the UE may perform the search for the PDCCH based at least in part on the payload size, as described above.

In some aspects, the payload size is identified based at least in part on the aggregation level and the offset associated with searching for the PDCCH.

In some aspects, the payload size is identified based at least in part on the aggregation level.

In some aspects, the payload size is identified based at least in part on the offset associated with searching for the PDCCH.

In some aspects, the payload size is identified further based at least in part on a search space type associated with the search, wherein the search space type is a common search space or a UE-specific search space.

In some aspects, a number of payload sizes, based at least in part on which the UE is to perform searches for the PDCCH, is associated with the aggregation level or the offset.

In some aspects, a number of decoding hypotheses, associated with the UE performing searches for the PDCCH, is associated with a capability of the UE.

In some aspects, the payload size is a first payload size, the aggregation level is a first aggregation level, the offset is a first offset, and the search is a first search, and the UE may: identify a second payload size associated with performing a second search for the PDCCH, wherein the second payload size is identified based at least in part on a second aggregation level, associated with performing the second search for the PDCCH, or a second offset associated with performing the second search for the PDCCH, wherein at least one of the second aggregation level is different from the first aggregation level, or the second offset is different from the first offset; and perform the second search for the PDCCH based at least in part on the second payload size.

In some aspects, the payload size is a first payload size, and the search is a first search, and the UE may: identify a second payload size associated with performing a second search for the PDCCH, wherein the second payload size is different from the first payload size, and wherein the second payload size is identified based at least in part on the aggregation level or the offset; and perform the second search for the PDCCH based at least in part on the second payload size.

In some aspects, the PDCCH includes downlink control information (DCI).

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:
   identifying, by a user equipment (UE), a payload size, associated with performing a search for a physical downlink control channel (PDCCH), from among a plurality of payload sizes,
      wherein the payload size is identified based at least in part on a mapping scheme, an aggregation level, associated with performing the search for the PDCCH, and an offset associated with performing the search for the PDCCH,
      wherein the mapping scheme indicates an association between the plurality of payload sizes, a plurality of aggregation levels including the aggregation level, and a plurality of offsets including the offset, and
      wherein the offset indicates at least one of:
         a location relative to a start of a subframe carrying a PDCCH search space, or
         a location in reordered resource elements of the PDCCH search space relative to a starting resource element associated with the aggregation level and a search space type; and
   performing, by the UE, the search for the PDCCH based at least in part on the payload size.

2. The method of claim 1, wherein the payload size is identified further based at least in part on the search space type associated with the search,
   wherein the search space type is a common search space or a UE-specific search space.

3. The method of claim 1, wherein a number of payload sizes, based at least in part on which the UE is to perform searches for the PDCCH, is associated with the aggregation level or the offset.

4. The method of claim 1, wherein a number of decoding hypotheses, associated with the UE performing searches for the PDCCH, is associated with a capability of the UE.

5. The method of claim 1, wherein the payload size is a first payload size, the aggregation level is a first aggregation level, the offset is a first offset, and the search is a first search, wherein the method further comprises:
   identifying a second payload size associated with performing a second search for the PDCCH,
      wherein the second payload size is identified based at least in part on a second aggregation level, associated with performing the second search for the PDCCH, or a second offset associated with performing the second search for the PDCCH,
      wherein at least one of the second aggregation level is different from the first aggregation level, or the second offset is different from the first offset; and
   performing the second search for the PDCCH based at least in part on the second payload size.

6. The method of claim 1, wherein the payload size is a first payload size, and the search is a first search, wherein the method further comprises:
   identifying a second payload size associated with performing a second search for the PDCCH,
      wherein the second payload size is different from the first payload size, and
      wherein the second payload size is identified based at least in part on the aggregation level or the offset; and
   performing the second search for the PDCCH based at least in part on the second payload size.

7. The method of claim 1, wherein the PDCCH includes downlink control information (DCI).

8. A user equipment (UE), comprising:
   a memory; and
   one or more processors operatively coupled to the memory, the one or more processors configured to:
      identify a payload size, associated with performing a search for a physical downlink control channel (PDCCH), from among a plurality of payload sizes,
         wherein the payload size is identified based at least in part on a mapping scheme, an aggregation level, associated with performing the search for the PDCCH, and an offset associated with performing the search for the PDCCH,
         wherein the mapping scheme indicates an association between the plurality of payload sizes, a plurality of aggregation levels including the aggregation level, and a plurality of offsets including the offset, and wherein the offset indicates at least one of:
a location relative to a start of a subframe carrying a PDCCH search space, or
a location in reordered resource elements of the PDCCH search space relative to a starting resource element associated with the aggregation level and a search space type; and
perform the search for the PDCCH based at least in part on the payload size.

9. The UE of claim 8, wherein the payload size is identified further based at least in part on the search space type associated with the search,
wherein the search space type is a common search space or a UE-specific search space.

10. The UE of claim 8, wherein a number of payload sizes, based at least in part on which the UE is to perform searches for the PDCCH, is associated with the aggregation level or the offset.

11. The UE of claim 8, wherein a number of decoding hypotheses, associated with the UE performing searches for the PDCCH, is associated with a capability of the UE.

12. The UE of claim 8, wherein the payload size is a first payload size, the aggregation level is a first aggregation level, the offset is a first offset, and the search is a first search, wherein the one or more processors are further configured to:
identify a second payload size associated with performing a second search for the PDCCH,
wherein the second payload size is identified based at least in part on a second aggregation level, associated with performing the second search for the PDCCH, or a second offset associated with performing the second search for the PDCCH,
wherein at least one of the second aggregation level is different from the first aggregation level, or the second offset is different from the first offset; and
perform the second search for the PDCCH based at least in part on the second payload size.

13. The UE of claim 8, wherein the payload size is a first payload size, and the search is a first search, wherein the one or more processors are further configured to:
identify a second payload size associated with performing a second search for the PDCCH,
wherein the second payload size is different from the first payload size, and
wherein the second payload size is identified based at least in part on the aggregation level or the offset; and
perform the second search for the PDCCH based at least in part on the second payload size.

14. The UE of claim 8, wherein the PDCCH includes downlink control information (DCI).

15. A non-transitory computer-readable medium storing one or more instructions for wireless communication, the one or more instructions comprising:
one or more instructions that, when executed by one or more processors of a user equipment (UE), cause the one or more processors to:
identify a payload size, associated with performing a search for a physical downlink control channel (PDCCH), from among a plurality of payload sizes,
wherein the payload size is identified based at least in part on a mapping scheme, an aggregation level, associated with performing the search for the PDCCH, and an offset associated with performing the search for the PDCCH,
wherein the mapping scheme indicates an association between the plurality of payload sizes, a plurality of aggregation levels including the aggregation level, and a plurality of offsets including the offset, and
wherein the offset indicates at least one of:
a location relative to a start of a subframe carrying a PDCCH search space, or
a location in reordered resource elements of the PDCCH search space relative to a starting resource element associated with the aggregation level and a search space type; and
perform the search for the PDCCH based at least in part on the payload size.

16. The non-transitory computer-readable medium of claim 15, wherein the payload size is identified further based at least in part on the search space type associated with the search,
wherein the search space type is a common search space or a UE-specific search space.

17. The non-transitory computer-readable medium of claim 15, wherein a number of payload sizes, based at least in part on which the UE is to perform searches for the PDCCH, is associated with the aggregation level or the offset.

18. The non-transitory computer-readable medium of claim 15, wherein a number of decoding hypotheses, associated with the UE performing searches for the PDCCH, is associated with a capability of the UE.

19. The non-transitory computer-readable medium of claim 15, wherein the payload size is a first payload size, the aggregation level is a first aggregation level, the offset is a first offset, and the search is a first search, wherein the one or more instructions further cause the one or more processors to:
identify a second payload size associated with performing a second search for the PDCCH,
wherein the second payload size is identified based at least in part on a second aggregation level, associated with performing the second search for the PDCCH, or a second offset associated with performing the second search for the PDCCH,
wherein at least one of the second aggregation level is different from the first aggregation level, or the second offset is different from the first offset; and
perform the second search for the PDCCH based at least in part on the second payload size.

20. The non-transitory computer-readable medium of claim 15, wherein the payload size is a first payload size, and the search is a first search, wherein the one or more instructions further cause the one or more processors to:
identify a second payload size associated with performing a second search for the PDCCH,
wherein the second payload size is different from the first payload size, and
wherein the second payload size is identified based at least in part on the aggregation level or the offset; and
perform the second search for the PDCCH based at least in part on the second payload size.

21. The non-transitory computer-readable medium of claim 15, wherein the PDCCH includes downlink control information (DCI).

22. An apparatus for wireless communications, comprising:

means for identifying a payload size, associated with performing a search for a physical downlink control channel (PDCCH), from among a plurality of payload sizes,
  wherein the payload size is identified based at least in part on a mapping scheme, an aggregation level, associated with performing the search for the PDCCH, and an offset associated with performing the search for the PDCCH,
  wherein the mapping scheme indicates an association between the plurality of payload sizes, a plurality of aggregation levels including the aggregation level, and a plurality of offsets including the offset, and
  wherein the offset indicates at least one of:
    a location relative to a start of a subframe carrying a PDCCH search space, or
    a location in reordered resource elements of the PDCCH search space relative to a starting resource element associated with the aggregation level and a search space type; and
means for performing the search for the PDCCH based at least in part on the payload size.

23. The apparatus of claim 22, wherein the payload size is identified further based at least in part on the search space type associated with the search,
  wherein the search space type is a common search space or a UE-specific search space.

24. The apparatus of claim 22, wherein the payload size is a first payload size, the aggregation level is a first aggregation level, the offset is a first offset, and the search is a first search, wherein the apparatus further comprises:
  means for identifying a second payload size associated with performing a second search for the PDCCH,
    wherein the second payload size is identified based at least in part on a second aggregation level, associated with performing the second search for the PDCCH, or a second offset associated with performing the second search for the PDCCH,
    wherein at least one of the second aggregation level is different from the first aggregation level, or the second offset is different from the first offset; and
  means for performing the second search for the PDCCH based at least in part on the second payload size.

25. The method of claim 1, wherein the offset indicates the location relative to the start of the subframe carrying the PDCCH search space.

26. The method of claim 1, wherein the offset indicates the location in reordered resource elements of the PDCCH search space relative to the starting resource element associated with the aggregation level and the search space type.

27. The UE of claim 8, wherein the offset indicates the location relative to the start of the subframe carrying the PDCCH search space.

28. The UE of claim 8, wherein the offset indicates the location in reordered resource elements of the PDCCH search space relative to the starting resource element associated with the aggregation level and the search space type.

29. The non-transitory computer-readable medium of claim 15, wherein the offset indicates the location relative to the start of the subframe carrying the PDCCH search space.

30. The non-transitory computer-readable medium of claim 15, wherein the offset indicates the location in reordered resource elements of the PDCCH search space relative to the starting resource element associated with the aggregation level and the search space type.

31. The method of claim 1, wherein the mapping scheme indicates, for a same aggregation level of the plurality of aggregation levels, a first offset associated with a first payload size and a second offset associated with a second payload size,
  the first offset and the second offset being included in the plurality of offsets, and
  the first payload size and the second payload size being included in the plurality of payload sizes.

* * * * *